United States Patent
Bedetti

(10) Patent No.: US 9,421,508 B2
(45) Date of Patent: Aug. 23, 2016

(54) SPRAYING METHOD AND NOZZLE FOR ATOMIZATION OF A LIQUID

(71) Applicant: Casale SA, Lugano-Besso (CH)

(72) Inventor: Gianfranco Bedetti, Milan (IT)

(73) Assignee: Casale SA (CH)

( * ) Notice: Subject to any disclaimer, the term of this patent is extended or adjusted under 35 U.S.C. 154(b) by 0 days.

(21) Appl. No.: 14/638,308

(22) Filed: Mar. 4, 2015

(65) Prior Publication Data

US 2015/0174544 A1 Jun. 25, 2015

Related U.S. Application Data

(62) Division of application No. 13/120,542, filed as application No. PCT/EP2009/061590 on Sep. 8, 2009, now Pat. No. 8,991,721.

(30) Foreign Application Priority Data

Oct. 16, 2008 (EP) ..................... 08018123

(51) Int. Cl.
*B05B 7/04* (2006.01)
*B05B 1/04* (2006.01)
*B05B 1/06* (2006.01)
*B01J 2/16* (2006.01)
*B05B 1/00* (2006.01)

(52) U.S. Cl.
CPC .. *B01J 2/16* (2013.01); *B05B 1/00* (2013.01); *B05B 7/0433* (2013.01); *B05B 7/0475* (2013.01)

(58) Field of Classification Search
CPC . B05B 7/0416; B05B 7/0433; B05B 7/0475; B01J 2/16
See application file for complete search history.

(56) References Cited

U.S. PATENT DOCUMENTS

| | | | |
|---|---|---|---|
| 3,240,254 A | 3/1966 | Hughes | |
| 3,774,846 A | 11/1973 | Schurig et al. | |
| 4,101,073 A * | 7/1978 | Curran | F04F 5/462 239/14.2 |
| 4,171,091 A | 10/1979 | van Hardeveld et al. | |
| 6,669,115 B2 * | 12/2003 | Sun | B05B 1/265 239/403 |
| 2003/0080212 A1 | 5/2003 | McCracken et al. | |
| 2004/0124288 A1 | 7/2004 | Bedetti | |
| 2007/0200007 A1 | 8/2007 | Stevens et al. | |
| 2008/0305420 A1 | 12/2008 | Kinoshita et al. | |

FOREIGN PATENT DOCUMENTS

| | | |
|---|---|---|
| WO | 01/41936 A1 | 6/2001 |
| WO | 02/074427 A2 | 9/2002 |
| WO | 02/083320 A1 | 10/2002 |

* cited by examiner

*Primary Examiner* — Darren W Gorman
(74) *Attorney, Agent, or Firm* — Akerman LLP

(57) ABSTRACT

A method for atomizing a liquid (L) in a spraying nozzle (1), wherein a gaseous phase (G) and a liquid (L) are fed to a mixing chamber (30) inside a nozzle (1), obtaining an emulsion of the gas in the liquid, the emulsion being under pressure inside the chamber and formed by gas bubbles enveloped by the liquid in a film state. The speed of the gaseous phase at the inlet of the mixing chamber is around the speed of sound or greater. The atomized liquid is obtained by an expansion of the emulsion at the outlet of the chamber. A suitable nozzle (1) is also disclosed, comprising a mixing chamber (30) and a distribution device (D) adapted to provide appropriate gas and liquid feed to form an emulsion.

6 Claims, 5 Drawing Sheets

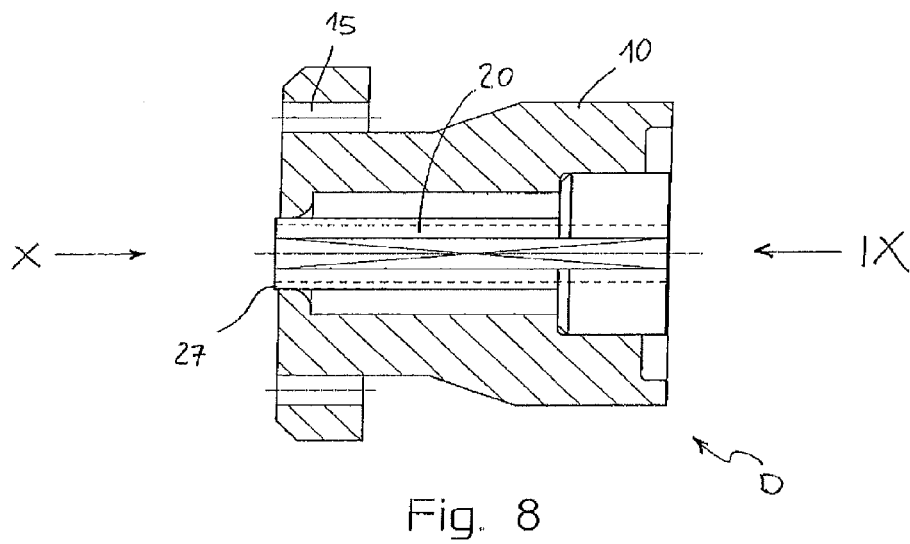
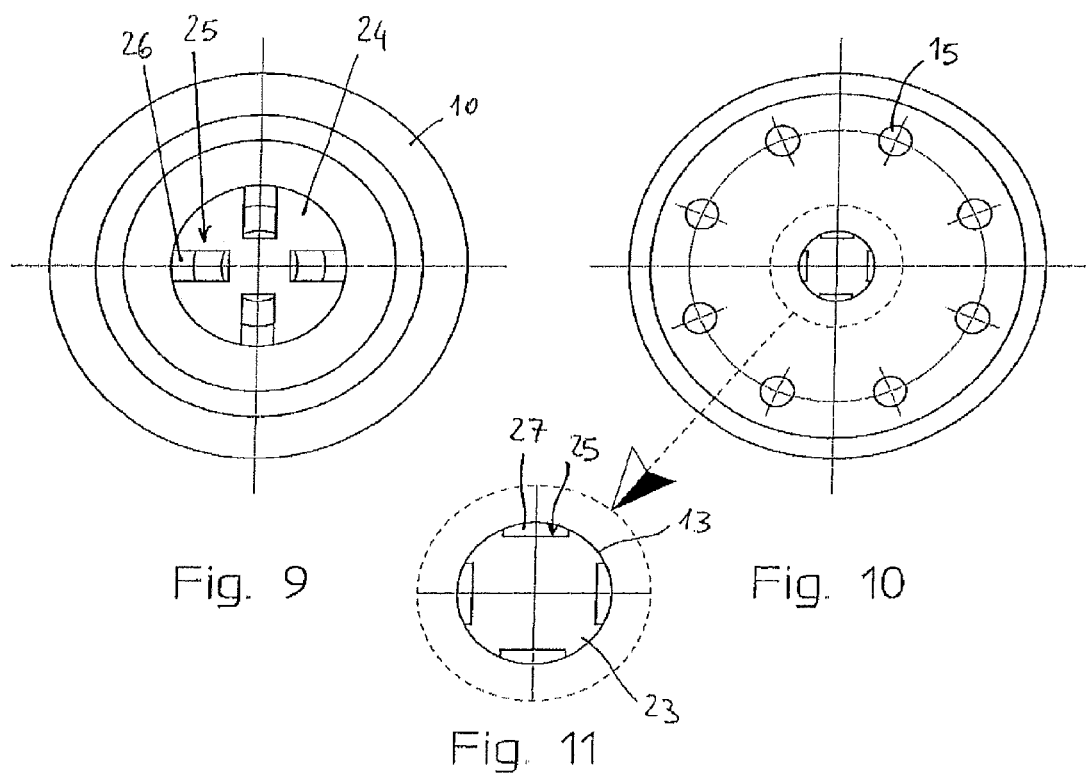
Fig. 8
Fig. 9    Fig. 10
Fig. 11

SPRAYING METHOD AND NOZZLE FOR ATOMIZATION OF A LIQUID

CROSS-REFERENCE TO RELATED APPLICATIONS

This application is a divisional of U.S. patent application Ser. No. 13/120,542, filed Mar. 23, 2011, which is a §371 National Phase of PCT/EP2009/061590, filed Sep. 8, 2009, which claims the benefit of European Patent Application No. 08018123.3, filed Oct. 16, 2008. The entire contents of these applications are incorporated herein by reference.

FIELD OF THE INVENTION

The invention relates to a spraying method and to a related spraying nozzle for atomization of a liquid. A preferred application of the invention is the atomization of a growth liquid in a fluid-bed granulator.

PRIOR ART

Atomization is the conversion of a bulk liquid into a fine spray or mist, by means of a suitable nozzle. In the prior art atomizing nozzles, the liquid is atomized substantially by mixing with a large amount of air, or another suitable gas, at a high speed. The air/liquid ratio is commonly around 25-50%; the related drawback is the need of a large air compressor and the energy consumption.

Atomization of a liquid has many fields of application. In the rest of this specification, reference will be made to a preferred application which is the atomization of the growth liquid in a fluid-bed granulator.

A fluid-bed granulator is a device to convert a liquid into solid particles of a predetermined shape and dimension. The process of fluid-bed granulation is commonly used for producing granules of urea, ammonium nitrate, ammonium chloride, fertilizers in general.

WO 02/074427 discloses a fluid-bed granulator comprising a container wherein an air blowing system maintains a given amount of granules in a fluidized state, and the granules are progressively coated and enlarged by an atomized growth liquid. Said growth liquid can be made of the pure substance to be granulated or a solution thereof. It is also known to feed the fluid bed with small solid particles (typically less than 2 mm diameter) of the same or another substance, called seeds, to provide starting points for the progressive deposition of the growth liquid and promote the granulation process. The process, in essential terms, takes place by droplets of the growth liquid wetting, sticking and solidifying on the seeds and granules which, together, form the fluid bed.

A fluid bed granulator must be fed with an atomized liquid, having small and little dispersed droplets, to obtain a slow speed of crystallization and, when the growth liquid is a solution (e.g. aqueous solution), to obtain a rapid evaporation of the solvent and high purity (e.g. 99.8%) of the product.

As stated above, the prior-art atomizers need a large air supply. Atomization of the growth liquid for granulation of urea, for example, is performed with air/liquid ratio typically between 0.4 and 0.5. The air flow rate is around 50% of the liquid flow rate, and air speed around 200 to 300 m/s and pressure up to 1 bar.

The relevant air consumption is a major disadvantage. A plant for producing urea rated at 2000 mtd (metric tons per day) would require around 1000 mtd of air, namely $10.^6$ Nm$^3$/d (one million of Normal cubic meters per day). Such a large amount of high-speed air involves an expensive and energy-consuming air feeding section. The capital investment for the machines (compressors, etc. . . . ) is relevant.

WO 02/083320 discloses a nozzle wherein an emulsion of a gaseous phase into a liquid phase is produced by feeding the liquid phase through a swirling device, and feeding the gaseous phase through radial holes or slits, downstream said swirling device. To form the emulsion, the liquid must be passed through small passages defined by the swirling device.

The invention discloses an improvement of the prior art atomizing process and the related nozzles.

SUMMARY OF THE INVENTION

The problem underlying the present invention is to provide an effective method and device for atomizing a liquid, with the aims of low air or gas consumption, and simple and reliable design of the nozzle.

The basic idea underlying the invention is to obtain atomized liquid by the expansion of a suitable emulsion of a gaseous phase into the liquid, and to obtain said emulsion by mixing small but very fast gaseous jet(s) with the liquid, inside an appropriate mixing chamber of the spraying nozzle, upstream the output orifice nozzle(s).

Hence, the invention provides a method for atomizing a liquid in a spraying nozzle, wherein said liquid and a gaseous phase are fed to said spraying nozzle, and an atomized flow is obtained at the output of said nozzle, the method being characterized in that: said gaseous phase and said liquid are fed via respective passages to a mixing chamber inside said nozzle, where an emulsion of the gas in the liquid is obtained, the emulsion being under pressure inside said chamber and formed by gas bubbles enveloped by the liquid in a film state; the speed of the gaseous phase at an inlet region of the mixing chamber is around the speed of sound or greater, to form said emulsion; said atomized flow is obtained by an expansion of said emulsion atomizing the liquid film at the outlet of said chamber.

The mass rate of the gaseous phase fed to said mixing chamber, in a preferred embodiment, is substantially less than the mass flow rate of the liquid fed to the same mixing chamber, and preferably the mass rate of the gaseous phase is 1 to 10% of the liquid mass rate.

The speed of the gaseous phase, according to the invention, is around the speed of sound, i.e. having the order of magnitude of the speed of sound, depending on the temperature; preferably the speed of the gaseous phase entering the mixing chamber is slightly subsonic, sonic or supersonic. The speed of the liquid, at said inlet region of the mixing chamber, is then much slower than the speed of the gaseous phase, being usually less than 10 m/s.

Preferably, when the gaseous phase is a bi-atomic gas, the absolute pressure in the mixing chamber is about ½ of the feeding pressure of the gaseous phase, as the bi-atomic gas is accelerated to the speed of sound with an expansion ratio about 0.5. In preferred embodiments, the gaseous phase is fed to said mixing chamber at a relative pressure of about 1 to 11 bar, and the relative pressure inside the mixing chamber is 0.5 to 5 bar.

In accordance with a preferred embodiment of the invention, the emulsion expands in a convergent zone of the end portion of the spraying nozzle, comprising one or more orifice opening(s).

According to another aspect of the invention, the gaseous phase is fed to said mixing chamber via a gas inlet comprising at least one axial gas stream, entering said inlet region of the mixing chamber, and the liquid phase inlet is distributed in a symmetric way around said gas inlet. In preferred embodiments, the liquid is distributed via multiple passages circular or having another shape, distributed around the gas inlet zone, for example on a circumference.

The gaseous phase is usually air. A preferred application of the above method is the granulation of urea, wherein the liquid flow is liquid urea (urea melt) or a water solution thereof, and the gas flow is air, preferably instrument-quality air.

The invention is suitable in particular, but not exclusively, for atomizing growth liquid in a fluid-bed granulation process. An example is the granulation of urea, wherein the growth liquid is liquid urea or a solution of urea; air is fed to the nozzle at a pressure of about 5-7 bar, while the pressure inside the mixing zone is 2-4 bar, so that the expansion of the air entering the mixing zone converts the pressure energy of the air into kinetic energy, i.e. the air flow is strongly accelerated and enters the mixing zone at around the speed of sound (typically around 400 m/s), while the liquid urea is fed at a much lower speed of a few meters per second.

An object of the invention is also a spraying nozzle adapted to operate in accordance with the above method. A preferred nozzle comprises a gas inlet passage, and a liquid feeding passage, and a mixing chamber in fluid communication with said gas passage and liquid passage, by means of a gas and liquid distribution device arranged to provide a high-speed gas inlet in an inlet zone of said chamber, and a much slower liquid inlet, distributed in a symmetrical way around said gas inlet in the inlet zone of the chamber, to form an emulsion of the gas in the liquid in said mixing chamber.

Said gas inlet is designed to provide a speed of the gaseous phase around that of sound, or greater. In a preferred embodiment, said mixing chamber is a cylindrical chamber symmetrical around the axis of the same nozzle, with a converging end portion ending with an outlet opening.

According to one embodiment, the gas and liquid distribution device is arranged to provide a high-speed gas inlet surrounded by the liquid inlet, for example in the form of liquid flow distributed over a circumference, at said inlet zone of the mixing chamber. Alternative embodiments are possible, for example with the liquid entering through an annular passage around the air inlet. The gas inlet can be in the form of one or more high-speed jets, preferably in the axis or near the axis of the mixing chamber.

In a preferred embodiment, the gas and liquid distribution device is substantially an assembly of an external body part with an internal part, the coupling between these two parts defining a relatively large gas inlet in communication with the nozzle gas inlet, and small gas outlet passage(s), open into the mixing chamber. In this way, the gas flow is accelerated through said device, converting pressure energy into kinetic energy. The device has further at least one liquid passage, in communication with the nozzle liquid inlet, and open in the same mixing chamber.

In a preferred realization, said external body part and internal part are formed substantially as a sleeve and a pin coaxially inserted into the sleeve. The sleeve has an axial gas passage with a rear opening in communication with the gas inlet of the nozzle, and a front opening in communication with the mixing chamber; the pin is shaped so as to define one or more passages at said front opening, suitable to generate high-speed gas stream(s) into the mixing chamber; the sleeve carries a ring part around said front opening, having a plurality of passages for the liquid phase in fluid communication with the mixing chamber and the liquid inlet of the nozzle. By means of these passages, liquid is distributed around the high-speed gas jet(s), at the inlet of the mixing chamber.

According to further preferred design features, the pin has a core portion having a diameter equal to the front opening of the sleeve, and a head portion having a diameter equal to the rear opening of the same. Longitudinal cuts are formed along the pin, from the head to the end of said core portion, the bottom surface of said cuts being at a distance from axis of the pin less than the radius of said core portion. At the inlet side of said distribution device, the gas flow is allowed by large slits defined by said longitudinal cuts in the head portion of the pin, while at the outlet side of the distribution device, small outlet passages are defined by said cuts, between the core portion of the pin and the front opening of the sleeve. An example will be given in the detailed description.

The term cuts should be intended in a broad manner, e.g. the pin can be machined or formed (e.g. moulded) directly with said cuts in the core portion and head portion, or the cuts can be formed as millings, or in any other equivalent manner.

Preferably, the nozzle is formed by a body part and a frusto-conical tip, screwed or fixed to said body part. The liquid and gas distribution device is fitted inside the nozzle, between the body part and the tip. The tip ends with a hollow cylindrical portion, defining the mixing chamber.

The main features of the invention are the formation of said emulsion in the mixing chamber, where the volume of the gas phase is much greater than the volume of the liquid phase, and the atomization of the liquid due to explosion of the bubbles forming the emulsion where pressure falls at the outlet opening.

The continuous gas jets exiting from the distribution device are converted into bubbles while contacting the liquid and the liquid, on the other hand, passes to a film condition, thus forming the said emulsion. In the convergent end portion of nozzle, downstream the mixing chamber, the pressure of the emulsion decreases and the gas bubbles expand, thus forming an emulsion with larger bubbles, but still enveloped in a continuous liquid film. Exiting the nozzle orifice, due to sudden pressure drop, the emulsion is fragmented by the "explosion" of the bubbles, breaking the liquid film in a number of tiny liquid fragments which, under the surface tension, rapidly convert into small, spherical droplets. The outlet of a nozzle operating with the above method appears as a very fine mist with a low speed.

A first advantage of the invention is the low air consumption and then less investment cost for the air feeding system including compressors and auxiliaries, compared to the prior-art atomizers. Usually the air consumption is as small as 1/10 of a prior art system.

The invention has the further advantage that only the gas (normally air) is fed through passages having a small cross section, while the liquid phase is fed at a lower speed and through passages with a greater section. The emulsion is obtained by means of feeding the two phases into the mixing chamber, and without the need to provide small passage sections on the liquid side, which is an advantage especially when the liquid may easily obstruct small passages. This is the case for example of liquid urea or solutions containing urea.

The disclosed nozzle is also easy to manufacture and assemble. In particular, as the small passages are obtained by the coupling of two separate pieces, namely the sleeve and the coaxial pin, there is no need to machine some very small holes or passages, resulting in a less expensive and easier manufacture.

It should also be noted that feeding the gaseous phase (normally air) at a relatively high pressure is not a disadvantage because, thanks to the mixing technique, a small quantity of air is sufficient.

A preferred, but not exclusive, application of the invention is a granulation apparatus. The invention can be used for example for the granulation of a product like urea, sulphur, ammonium nitrate or another fertilizer. The invention is preferably used in combination with the fluid-bed granulator disclosed in the patent application No. WO 02/074427.

The advantages and the features of the invention will be better shown from the description of an illustrative and non limiting embodiment of the invention, made hereinafter with reference to the enclosed drawings.

BRIEF DESCRIPTION OF THE DRAWINGS

FIG. 8 is a cross sectional view of the nozzle of FIG. 4, 5 and the pin of FIGS. 6 and 7, coupled together to form the gas and liquid distribution device of the nozzle.
FIGS. 9 and 10 are a front and rear view of the device of FIG. 8, seen respectively from directions IX and X indicated in said FIG. 8.
FIG. 11 is a detail of FIG. 10 showing the small air passages at the outlet side of the device.

DETAILED DESCRIPTION OF A PREFERRED EMBODIMENT

Figure 1:
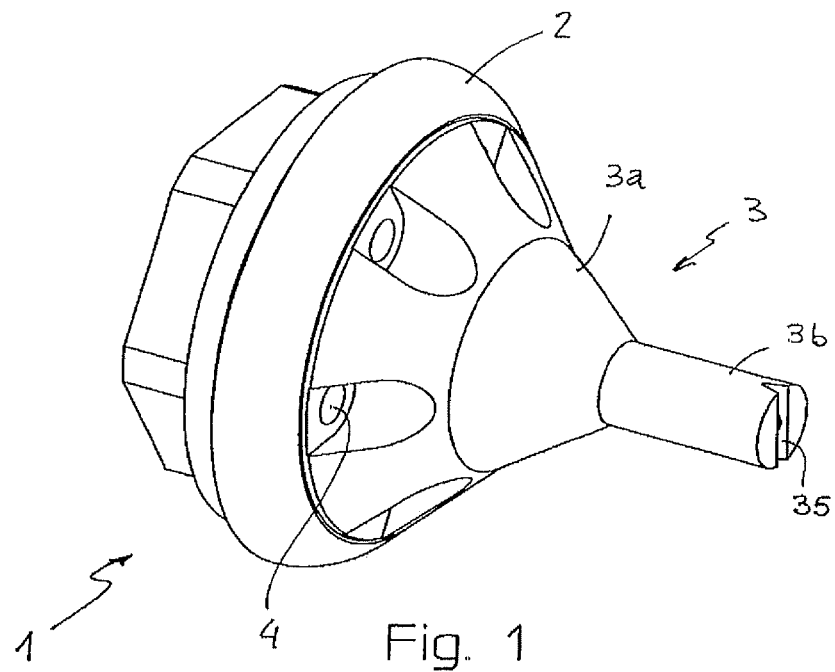
FIG. 1 is a front perspective view of a nozzle adapted to in accordance with a preferred embodiment of the invention.
Figure 2:
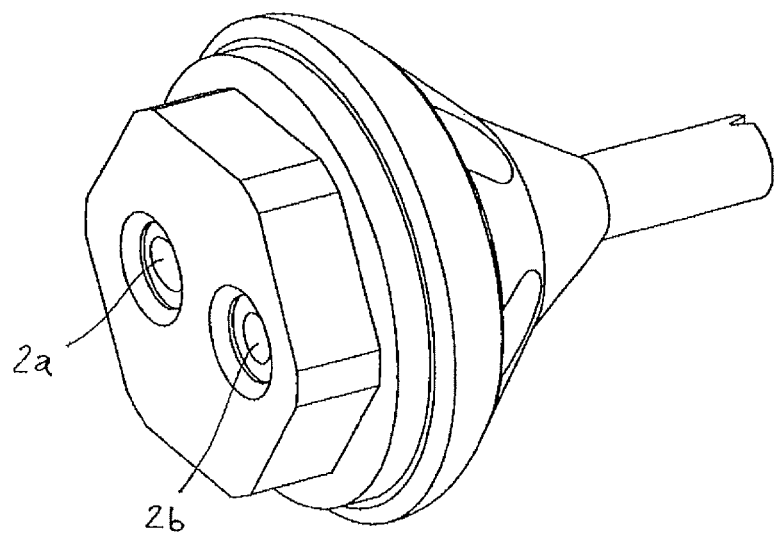
FIG. 2 is a rear perspective view of the nozzle of FIG. 1.

A nozzle 1 comprises a main body part 2 and a tip 3, fixed to the main body 2 by screws 4 or any other appropriate means. The tip 3 has a substantially frusto-conical base portion 3a and a substantially cylindrical portion 3b, which in the example are integral in a single piece, but in different embodiments may be realized as separate pieces.

Figure 3:
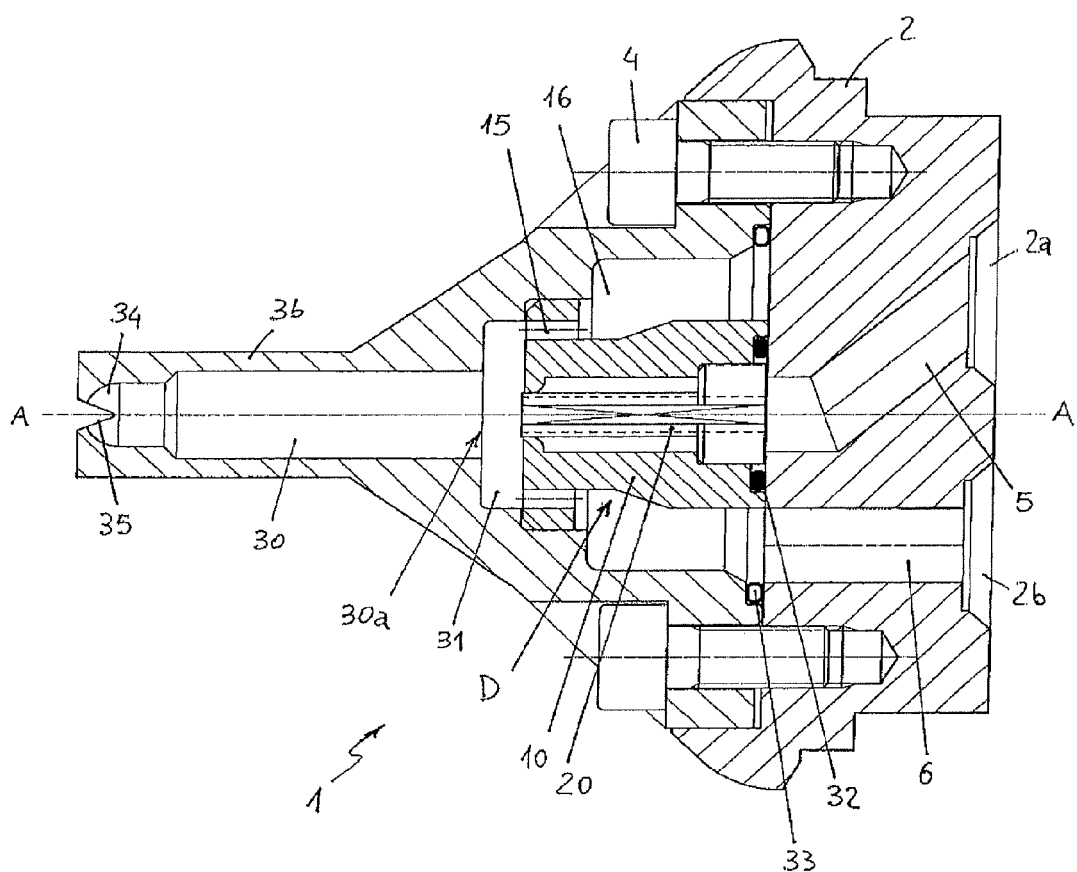
FIG. 3 is a sectional view of the nozzle of FIGS. 1 and 2.
Figure 4:
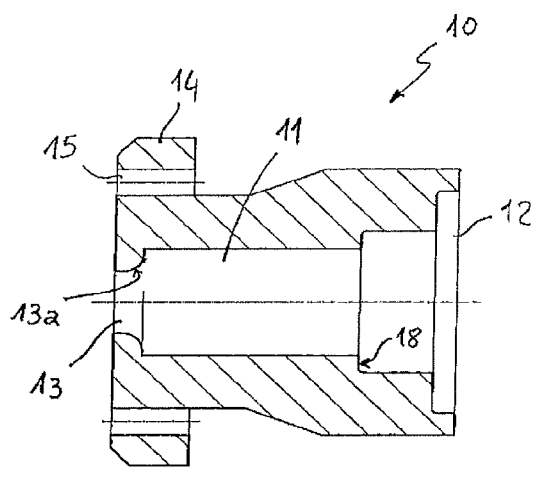
FIGS. 4 and 5 are a sectional and a front view of the external part or sleeve of the gas and liquid distribution device of the nozzle of FIG. 3.
Figure 5:
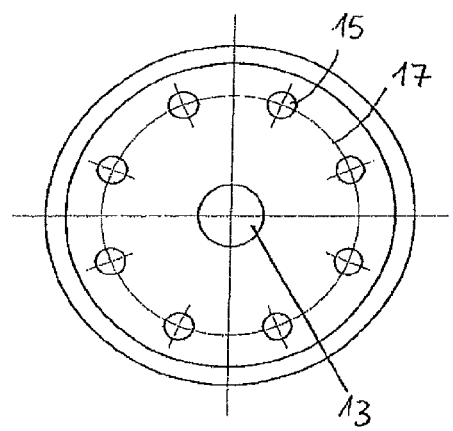
Figure 6:
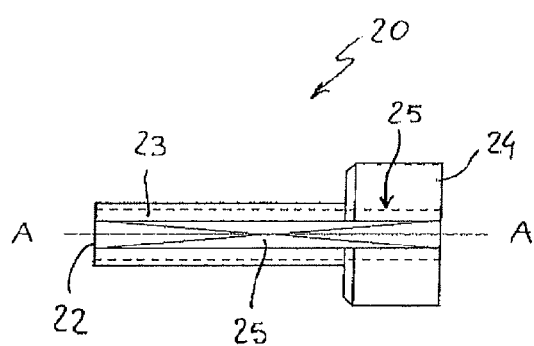
FIGS. 6 and 7 are a sectional and a front view of the internal part or pin of the gas and liquid distribution device of the nozzle of FIG. 3.
Figure 7:
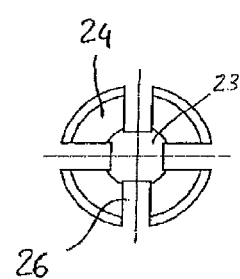

The main body part 2 has a rear air inlet 2a and liquid inlet 2b. Said inlets 2a and 2b are in communication with a gas passage 5 and a liquid passage 6 in the body part 2. The nozzle portion 3b ends with a nozzle orifice 35 (FIG. 3).

A mixing chamber 30 is formed inside the portion 3b of the nozzle tip. The chamber 30 has an inlet region 30a with a portion 31 which, in the example, has a larger diameter. Downstream the chamber 30 there is a converging section 34 and the output orifice 35 of the nozzle 1. Said orifice 35 can be formed to obtain a cone or fan-shaped flow.

The nozzle 1 comprises an internal gas-liquid distribution device D. Basically, said device D has an inlet side receiving the air and liquid flows from the channels 5 and 6, and an outlet side feeding the mixing chamber 30. The distribution device D is arranged to provide appropriate air and liquid feed in the region 30a of the mixing chamber 30. In the example, the device D is designed to provide high-speed gaseous jets near the axis A-A, surrounded by the liquid distributed in a symmetric way over a circumference.

The following is a description of a preferred embodiment with reference to the attached FIGS. 3 to 11.

The device D is formed by a sleeve 10 and a pin 20. The pin 20 is inserted coaxially into the sleeve 10, and the sleeve and pin assembly is positioned between the body part 2 and the tip 3, in a seat formed by the frusto-conical portion 3a of the tip 3.

The sleeve 10 (FIGS. 4-5) is substantially a cylindrical body with an axial passage 11, having a rear opening 12 and a front opening 13, said front opening having preferably a diameter smaller than the front opening. The front portion of the sleeve 10 has an external ring 14 with a plurality of holes 15, distributed on a circumference 17 and surrounding the front opening 13 of the axial passage 11. The internal rim 13a of said front opening 13 is rounded.

The pin 20 (FIGS. 6-7) has an end portion 22 with an overall dimension, such as diameter, substantially matching the inner dimension of the front opening 13 of the passage 11, and said end portion 22 is shaped so as to leave small passage(s) between the pin and the sleeve, at the outlet side of the device D.

More in detail, and in a preferred embodiment, the pin 20 comprises a cylindrical core portion 23, and a head portion 24 having a diameter greater than that of the core portion 23. At least one longitudinal cut 25 is formed along the pin 20, from the head 24 to the end 22 of the core portion 23, the bottom surface of said cut 25 being at a distance from axis of the pin (which in use is the same axis A-A) less than the radius of the core 23. Preferably, there are multiple cuts equally angularly spaced, e.g. four cuts at 90.degree. intervals, as shown.

The device D formed by the sleeve 10 and pin 20 is shown in FIG. 8. The pin 20 has about the same length of the sleeve 10, and can be fitted into the sleeve and through the passage 11, until the head portion 24 rests on the annular surface 18 indicated in FIG. 4.

At the inlet side of the device D (FIG. 9), the diameter of the head portion 24 substantially matches the inner diameter of the rear opening 12, with a suitable clearance for free mounting, and the gas flow is allowed by the relatively large slits 26 defined by the cuts 25 on the pin head 24.

At the opposite outlet side of the device D (FIG. 10), the diameter of the core portion 23 substantially matches the diameter of the passage 13, with a suitable clearance for free mounting. Due to the cuts 25, and their distance from axis A-A being less than the radius of core 23, a small outlet passage 27 is defined by each cut(s) 25 at the end portion 22 of the pin. Said small passage(s) 27, due to their little cross section, are able to generate high-speed gas jets entering the chamber 30, when the nozzle 1 is in use. A detail of the air outlet of the device D is shown in FIG. 11, showing the passages 27, between the pin core 23 and the passage 13 of the sleeve.

The passages or slits 27, in a preferred embodiment of the invention, have an elongated shape and are equally spaced around the axis A-A of the nozzle 1; more preferably four to eight cuts 25 and corresponding slits 27 are provided. In another (not shown) embodiment of the invention, the passages 27 can be obtained with a hexagonal element such as a bolt or screw, coaxial to a circular opening such as the passage 13.

The device D is positioned so that the axial passage 11 of the sleeve 10, via the rear opening 12, is in fluid communication with the air inlet. An annular space 16 is defined around the device D, between the sleeve 10 and the portion 3a of the tip 3, said space 16 being in fluid communication with the liquid inlet. The holes 15 provides fluid communication between said space 16 and the mixing chamber 30.

It can be appreciated that the air feed is in communication with the mixing chamber 30 via the passage 6 in the body part 2, and then via the passages 26 and 27 in the distribution device D. The liquid feed, on the other hand, is in communication with the mixing chamber 30 via the annular space 16 and the holes 15. An O-ring 32 ensures the tightness of the gas path and another O-ring 33 is for the tightness of the liquid path. Other gaskets, if appropriate, may be used.

It can be further appreciated that the holes 15 provides a discrete liquid feeding to the chamber 30, distributed on the circumference 17 around the gas passages 27. In other embodiments of the invention, the liquid can be fed to the chamber 30 through a circular, annular opening surrounding the gas streams entering the same chamber 30. To this purpose, a continuous annular passage, or two or more elongated, arc-shaped slits may replace the holes 15.

Dimensions, of course, may vary according to the needs. The inlet flow rate is determined by the total cross section of the passages 27, which are to be designed accordingly. The figures relate to a sonic embodiment, wherein the speed of air at the outlet of the passages 27 is about the speed of sound. In a supersonic embodiment, the profile of the passage 13 and/or the pin 20 is such to determine a convergent/divergent channel at said passages 27.

Figure 12:
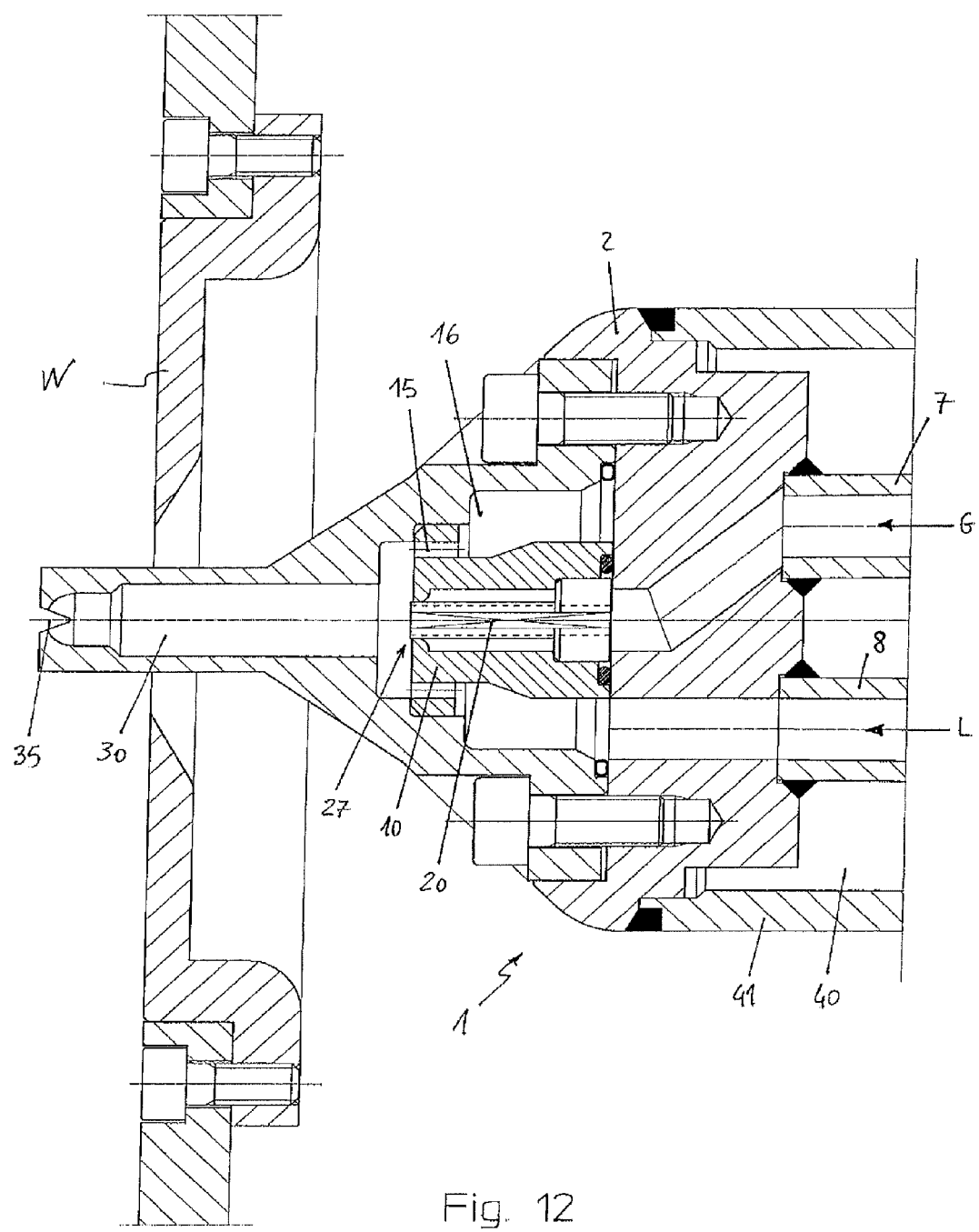
FIG. 12 is a sectional view of the nozzle in an example of use in a fluid-bed granulator of urea.

Turning now to the example of use of FIG. 12, the nozzle 1 is coupled to a wall W of a fluid-bed granulator for urea, and respective air and liquid conduits 7, 8 are connected to the rear inlets 2a and 2b. A cover 41 defines an interspace 40 around the conduits 7 and 8, which can be used, if appropriate, for supplying a heating medium.

Air G is fed through the conduit 7 at a pressure of around 5-7 bar, while pressure in the mixing chamber 30 is kept lower, for example 2 to 4 bar. Flowing through the passages 27, air is accelerated as part of its pressure energy is converted into kinetic energy, entering the mixing chamber 30 in the form of axial streams concentrated near the axis A-A.

The liquid L, in the meantime, is fed to the same mixing chamber 30 from conduit 8 via the space 16 and passages formed by the holes 15, at a low speed of a few meters per second. The liquid streams generated by the holes 15 enter the portion 31 of the mixing chamber 30, and are then directed in the region of air streams. In the example, the liquid in the conduit 7 is urea melt, and hot steam is supplied in the interspace 40 to keep the urea in a fluid state.

Hence, the gaseous phase, in this example the air flow, is dispersed in the form of very small bubbles in the liquid phase, forming an air-in-liquid emulsion in the chamber 30, substantially of air bubbles enveloped in a continuous liquid film. Downstream, the convergent portion 34 provides an acceleration zone, where pressure of the emulsion is lowered and, as a consequence, the air bubbles expand, leading to a mixture wherein bubbles are greater and surrounded by the film of liquid phase.

Exiting the nozzle orifice 35, the pressure falls and the emulsion is fragmented into tiny droplets which, under the action of surface tension, form small, spherical droplets. The speed of the liquid particles downstream the orifice 35 is low, despite the high speed of the air flow inside the mixing chamber 30. The output of the nozzle 1 actually appears as a fine mist of atomized liquid. Hence, the nozzle 1 carries out the method as disclosed above.

The invention claimed is:

1. A spraying nozzle for atomizing a liquid, the nozzle comprising:
   a gas inlet passage;
   a liquid feeding passage;
   a mixing chamber; and
   a gas and liquid distribution device arranged to provide a gas inlet in an inlet zone of said chamber and a liquid inlet at the same inlet zone of the chamber, so as to put into fluid communication said gas passage and liquid passage with said mixing chamber and to form an emulsion of the gas in the liquid in said mixing chamber;
   wherein said gas and liquid distribution device comprises a sleeve and a pin, the pin being coaxially inserted into said sleeve, and wherein:
   the sleeve has an axial gas passage with a rear opening in communication with the gas inlet, and a front opening with an internal rounded edge and in communication with the mixing chamber; the pin being shaped so as to define passages at said front opening suitable to generate high-speed gas jets into said mixing chamber; and
   the sleeve has a ring portion around said front opening and having a plurality of passages for the liquid, said passages being in fluid communication with the mixing chamber and with the liquid inlet, so that the liquid flow from the passages of said ring portion, in use, is distributed around the high-speed gas jets, at the inlet zone of said mixing chamber.

2. The nozzle according to claim 1, wherein said gas and liquid distribution device is arranged to provide that the liquid inlet is distributed in a symmetrical way around said gas inlet in the inlet zone of the chamber.

3. The nozzle according to claim 2, wherein said gas and liquid distribution device is arranged to provide a plurality of gas jets surrounded by a liquid flow distributed over a circumference, at said inlet zone of the mixing chamber.

4. The nozzle according to claim 1, wherein the pin has
   a core portion having a diameter equal to said front opening of the sleeve, and
   a head portion having a diameter equal to said rear opening of the sleeve,
   wherein longitudinal cuts are formed along the pin, from the head portion to an end of said core portion, a bottom surface of said cuts being at a distance from a longitudinal axis of the pin, which is less than a radius of said core portion, and
   wherein the pin is inserted into said sleeve forming the gas-liquid distribution device, so that at an inlet side of said distribution device, the gas flow is allowed by large slits obtained by said longitudinal cuts at the end portion of the pin, while at an outlet side of the distribution device, said passages suitable to generate high speed gas jets are defined by said cuts, between the core portion of the pin and the front opening of the sleeve.

5. The nozzle according to claim 1, the nozzle having a tip containing said mixing chamber and ending with a convergent portion and with a nozzle orifice, said nozzle orifice being shaped to form a cone or fan-shaped atomized flow.

6. A fluid bed granulation apparatus, comprising at least one nozzle according to claim 1.

* * * * *